June 11, 1968     D. N. JACKLEY     3,388,003
SEAWATER BATTERY WITH ELECTRODES IN DECREASING PASSAGE AREAS
Filed July 23, 1966     2 Sheets-Sheet 1

*INVENTOR.*
DONALD N. JACKLEY
BY
MICHAEL F. OGLO
ROY MILLER
ATTORNEYS.

June 11, 1968          D. N. JACKLEY          3,388,003
SEAWATER BATTERY WITH ELECTRODES IN DECREASING PASSAGE AREAS
Filed July 28, 1966          2 Sheets-Sheet 2
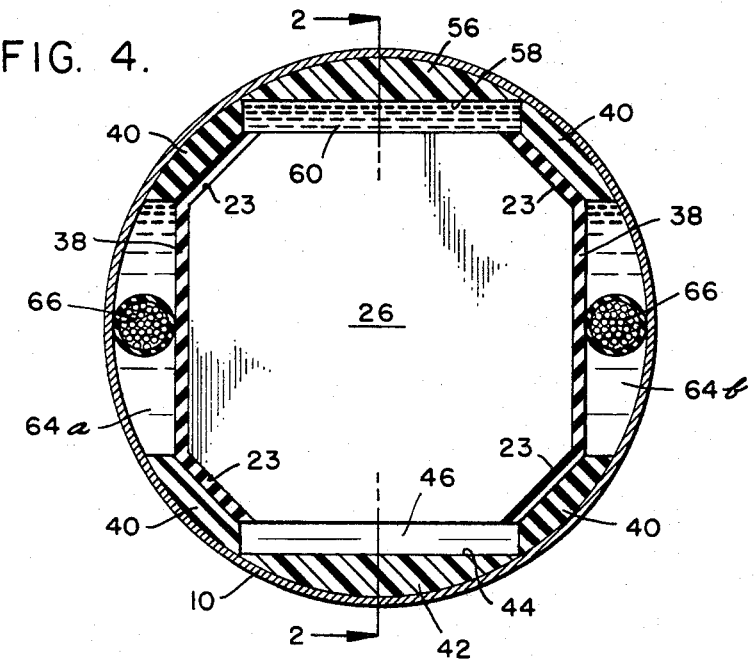
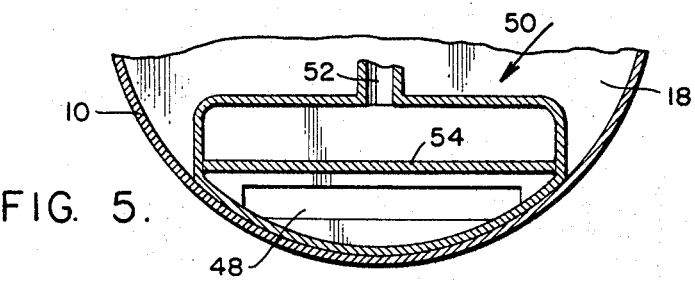
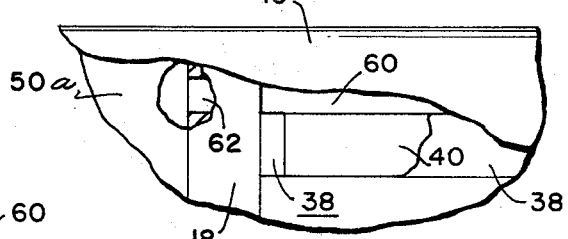
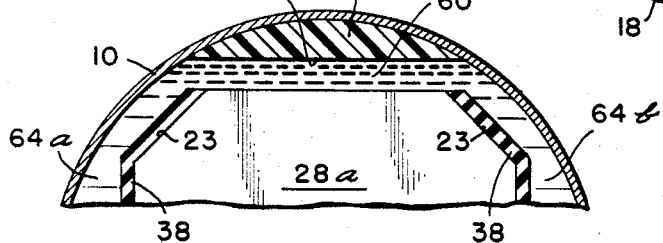
*INVENTOR.*
DONALD N. JACKLEY
BY MICHAEL F. OGLO
ROY MILLER
ATTORNEYS.

United States Patent Office 3,388,003
Patented June 11, 1968

3,388,003
SEAWATER BATTERY WITH ELECTRODES IN DECREASING PASSAGE AREAS
Donald N. Jackley, Monrovia, Calif., assignor to the United States of America as represented by the Secretary of the Navy
Filed July 28, 1966, Ser. No. 569,008
2 Claims. (Cl. 136—100)

The invention described herein may be manufactured and used by or for the Government of the United States of America for governmental purposes without the payment of any royalties thereon or therefor.

This invention relates to improvements in seawater batteries of the type in which there is a continuous flow of seawater electrolyte through the spaces between the electrode plates which form the basic electromotive couples of the battery.

In prior art seawater batteries, it has been the experience that the active chemical agents of the individual electrode plates have not been uniformly consumed, with the result that some of the individual electromotive couples fail while considerable potential chemical energy remains in conjunction with other couples of the battery. In such instances, the battery experiences a considerable drop in power output upon the failure of the first few couples. Therefore, the remaining potential energy, as a practical matter, is never realized.

Accordingly, an object of the present invention is to provide an improved seawater battery in which the active materials of the electrode plates of all the electromotive couples are substantially uniformly consumed throughout the period of the active life of the battery.

Another object is to provide an improved seawater battery in accordance with the previous objective, which is simple in construction and economical to fabricate.

Other objects and many of the attendant advantages of this invention will be readily appreciated as the same becomes better understood by reference to the following detailed description when considered in connection with the accompanying drawings wherein:

FIG. 4 is a section taken at line 4—4, FIG. 2;

FIG. 5 is an enlarged section taken at line 5—5, FIG. 2;

FIG. 6 is an enlarged section taken at line 6—6, FIG. 2; and

FIG. 7 is a side elevation-detail indicated by arrow 7, FIG. 1.

Figure 1:
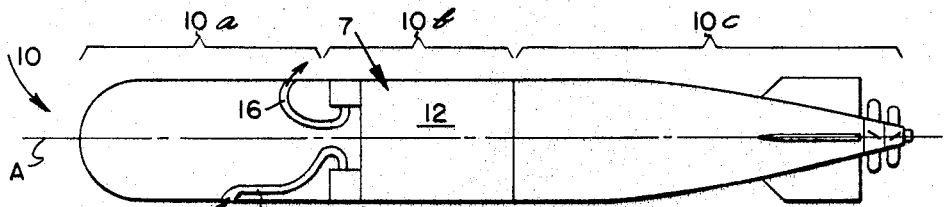
FIG. 1 is a side elevation of a torpedo, a portion being broken away to show the battery forming the subject of the invention.

Referring now to the drawing, FIG. 1 illustrates a torpedo hull 10 of a conventional form, composed of several separable longitudinal sections 10a, 10b, and 10c. The subject of the invention is an improved torpedo propulsion battery 12, FIGS. 1 and 2, of the type adapted to be stored with its electrolyte compartment 13 in dry condition, and to be activated at the time of use by introduction of seawater thereinto. Battery 12 is shown as contained in the middle torpedo compartment hull section 10b. A scoop and inlet tube 14 opens into the bottom of the torpedo hull ahead of section 10b, forming the seawater supply line for the battery. After circulation of the seawater within battery 12, it is exhausted through an exhaust port and outlet tube 16, which opens to the upper zone of the torpedo hull ahead of section 10b.

Figure 2:
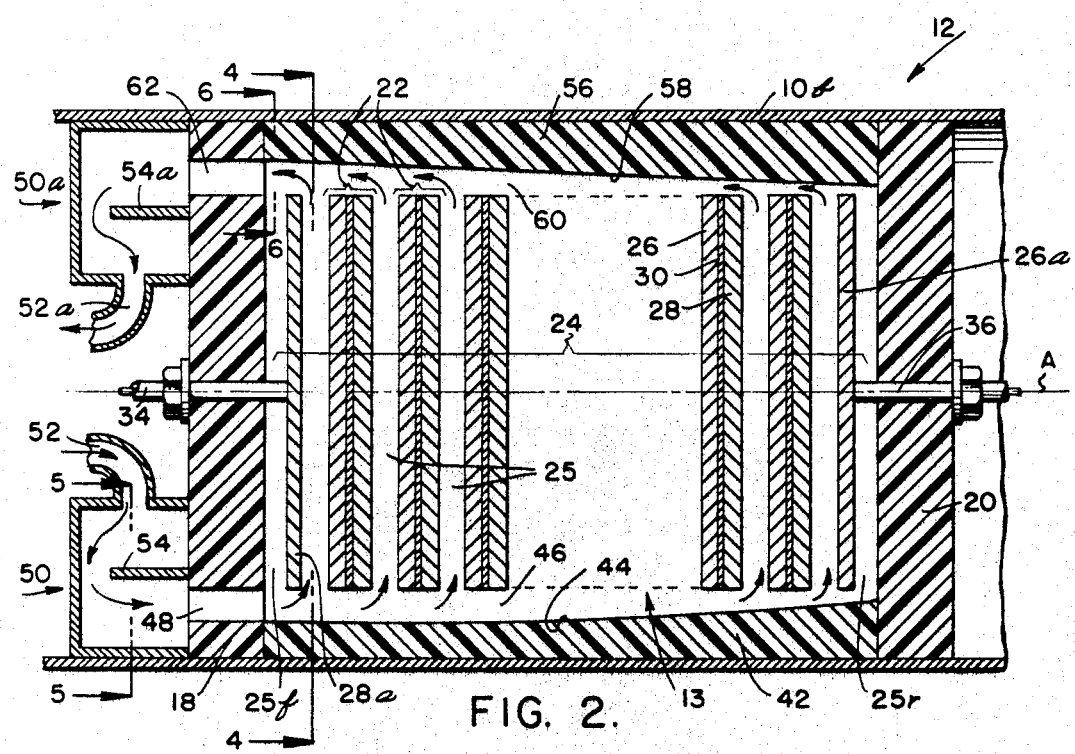
FIG. 2 is an enlarged central longitudinal section of the battery, and in which the battery electrode units are shown schematically.
Figure 3:
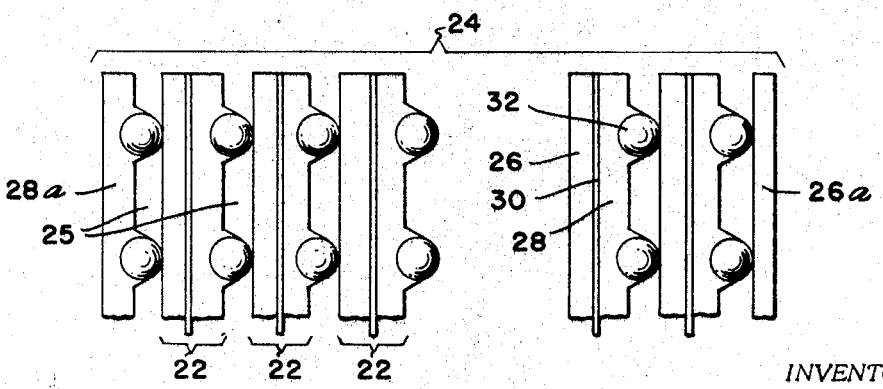
FIG. 3 is an enlarged detail showing the actual structure of the battery electrode units of FIG. 2.

Referring now to FIGS. 2 and 3, front and rear bulkheads 18 and 20 are affixed adjacent the front and rear ends of hull section 10b. These bulkheads are made of a suitable dielectric material. A plurality of vertically extending electrode plate units 22 (shown schematically in FIG. 2 and in actual structure in FIG. 3) are arranged in a row 24 along the torpedo axis A, and in spaced relationship to one another within the compartment formed between the two bulkheads with transverse electrolyte spaces 25 between each adjacent pair. Each electrode unit 22 consists of a positive plate element 26 at the front side of the unit and a negative plate element 28 at the rear side, formed into an integral assembly with a thin silver foil 30 therebetween The forwardmost plate structure 28a consists of a negative plate element alone and the rearwardmost plate structure 26a consists of a positive plate element, alone. Spacing between the units is provided by small spacing beads 32 (FIG. 3, only) partially imbedded in the negative plate elements. The confronting positive plate element and the negative plate element of each pair of adjacent units defines a battery couple which produces an electromotive force when the electrolyte spaces 25 are filled with seawater. Row 24 forms a so-called "battery pile" in which the couples are electrically in series. An output terminal 34 is electrically coupled to the forwardmost plate structure 28a forming an external electrical negative connection for the battery. A similar terminal 36 coupled to the rearwardmost plate structure 26a forms the external positive electrical connection.

As best shown in FIG. 4 the individual electrode plate units 22 are square shaped with their corners cut to form diagonal edges 23, to generally conform to the circular cross section of hull 10. A longitudinally extending member 38, made of a compressible and pliant dielectric material covers the lateral edges of the electrode plate units. Longitudinally extending spacer strips 40 are jammed between the outer surface of cover members 38 and the inner wall of the torpedo hull in the zone between cover member 38 and torpedo hull 10b adjacent the edges 13 of the electrode units. Strips 38 are also made of a compressible and pliant material, and in assembling the battery 12, they together with cover member 38, are compressed to form a rigid support structure for the row 24 of electrode units.

A chordal cross sectioned insert 42 of suitable material, such as hard rubber, is bonded to the lower wall of hull 10b. The upper face 44 of insert 42 is shaped to converge towards the bottom edge of the row 24 of electrode units in the rearward direction, with an upwardly concave curvature of convergence. The space between the bottom edge of row 24 and face 44 defines an oblong cross sectioned manifold cavity 46 having decreasing cross sectional area in the rearward direction. An oblong seawater inlet port 48 (FIGS. 2 and 5) provides the opening to the front end of manifold cavity 46. As best shown in FIG. 5, a plenum chamber 50 is affixed to the front face of bulkhead 18 about the inlet port 48. Chamber 50 has an inlet port 52 to which the scoop and inlet tube 14 is connected, and a baffle 54 is provided within the chamber across from the inlet port. Another chordal insert 56 is bonded to the upper wall of the torpedo hull in a similar manner to that in the lower insert 42. Insert 56 is like insert 42 except that its lower face 58 converges toward the battery edges in a rearward direction with a substantially fixed angle of slope of convergence towards the upper edges of row 24 of electrodes. The space between face 58 and the uppre edges of row 24 forms an outlet manifold cavity 60, which like cavity 46 has an oblong cross section which decreases in cross sectional area in the rearward direction. An oblong outlet port 62 communicates cavity 58 with the front face of bulkhead 18. A plenum chamber structure 50a similar to that of the inlet manifold serves to adapt port 62 for connection to the exhaust port tube 16. Like parts of this chamber are designated by corresponding reference numerals, but have a suffix letter a.

The upwardly concave curvature of upper face 44 of insert 42 is chosen to provide rearwardly decreasing cross sectional area of manifold cavity 46 such that the static pressure of the seawater electrolyte, which flows through the cavity and is introduced into the bottom of spaces 25 therefrom, is constant along its length. This curvature may be calculated by use of the following formula:

$$A = 4KL\left(1-\frac{X}{L}\right)^{3/4} + C_1\left(1-\frac{X}{L}\right) \quad (1)$$

wherein $$K = 0.028\left(\frac{v}{Q_0}\right)^{1/4} \times C_{ave}^{5/4} \quad (2)$$

and wherein $A$ = cross sectional area of the manifold cavity;
$v$ = kinematic viscosity;
$Q_0$ = nominal desired flow rate into battery (ft.³/sec.);
$C_{ave}$ = average wetted perimeter of cross sections along the cavity;
$C_1$ = a constant to be determined for each particular change in configuration of the battery;
$X$ = distance from the inlet end of the manifold cavity; and
$L$ = total length of the manifold cavity.

The fixed slope of convergence of face 58 of insert 56 is chosen to provide rearwardly decreasing cross sectional area of manifold cavity 56 such that the static pressure of seawater electrolyte, which emerges from spaces 25 and flows along cavity 56 and out of port 62, is constant along its length. This slope of convergence may be calculated using the previous formula, except that $$K = -0.028(v/Q_0)^{1/4} \times C_{ave}^{5/4}$$

The above formulas have been derived in accordance with well known mathematical techniques employed in deriving solutions by the numerical method, on the basis of the head loss equations for turbulent flow conditions, found at page 517 of "Boundary Layer Theory," by Dr. Herman Schlichting, published by McGraw-Hill Co., New York, N.Y., 1966. Under certain circumstances the manifold cavity shapes may be calculated for laminar flow conditions using the head loss equation for laminar flow, found at the same page.

Chordal cross sectioned cavities 64a, 64b are formed between cover members 38 and the inner surface of the torpedo hull 10b. As shown in FIG. 4, the spacer strips 40 block and seal off communication between manifold cavities 46 and 48 and chordal cavities 64a and 64b along the length of row 24. The spacer strips 40 are cut slightly shorter than the distance between front and rear bulkheads 18 and 20. As best shown in FIG. 6, taken in conjunction with FIG. 7, the somewhat shorter spacer strips are then assembled with their end edges spaced from the bulkheads so that they do not block the chordal cavities 64a and 64b at the frontmost and the rearmost transverse spaces 25f and 25r. This is done to allow the chordal cavities to be flooded with the seawater inducted through tube 14, which in turn results in pressure balancing the internal battery structure and pressure balancing the hull section 10b all along its circular periphery. Any electrical power wires, control wires, or the like which need to be communicated longitudinally through torpedo hull section 10b are contained in a pressure resistant tubing 70 which extends between and through bulkhead 18 and 20. Suitable seals are provided throughout the structure of battery 12 to pressure seal the portions thereof containing ambient seawater from the water tight interior of the torpedo hull 10.

In operation, the torpedo is suitably launched with scoop and inlet tube 14 open to flood electrolyte compartment 13 and thereby activate the battery, and in turn energize the propulsion motor (not shown). The reaction of the water acting on the inlet to scoop tube 14 provides a continuous seawater flow through the battery compartment and out through exhaust port and outlet tube 16, under the forward motion of the torpedo. The seawater flows at a predetermined rate, in accordance with the torpedo speed and size of inlet, and enters manifold cavity 46 as a continuous turbulent stream through inlet port 48. The manifold cavity 46 introduces the seawater into the transverse spaces 25 along row 24 of electrode plate units. Because of the shaping of wall 44 of insert 42, the static pressure within cavity 46 is uniform along its length. The shaping of wall 58 causes the flow through outlet manifold 60 to have uniform static pressure therealong. The fact of the uniform static pressure along both inlet cavity 46 and outlet cavity 60 provides a uniform difference in static pressure along the row 24 of electrode plate units, so that the rate of flow within each transverse space 25 in the battery pile is uniform. As a result of the substantially uniform rate of flow along all spaces of the battery pile, the individual couples of the battery will tend to become consumed at the same time.

While this invention has been described in conjunction with an embodiment in which the flow rate of seawater electrolyte through the battery is constant for the period of operation of the battery, it is to be understood that it is applicable also for those situations in which the flow rate may be caused to vary, as for example by a regulating valve in the inlet scoop tube 14, such as is disclosed in U.S. Patent 3,154,040, or where an electromechanical regulation control of recirculation may be employed, such as disclosed in U.S. Patent 3,012,087. In such instances the flow rate for the majority of the period of operation of the battery is used as the design point for shaping walls 44 and 58.

Obviously many modifications and variations of the present invention are possible in the light of the above teachings. It is therefore to be understood that within the scope of the appended claims the invention may be practiced otherwise than as specifically described.

What is claimed is:
1. In a seawater battery for torpedo propulsion of the type including:
  (i) a row of vertically extending parallel spaced electrode plate units, said units each comprising integrally joined positive and negative flat plate elements with a conductor sheet therebetween, the positive and negative elements of all the units of the row being uniformly disposed in the direction of one and the other, respectively, of opposite ends of the row so that opposite polarities of plate elements confront each other across the spaces between the units,
  (ii) a seawater inlet manifold cavity extending along the lower edges of the row of electrode plate units for introducing a flow of seawater to the lower ends of the spaces between adjacent units, said inlet manifold cavity adapted for connection to a seawater supply line at a predetermined one of the opposite ends of the row, and
  (iii) a seawater outlet manifold cavity extending along the upper edges of the row of electrode plate units, said outlet manifold cavity forming an outlet zone for receiving the flow of seawater from the upper ends of the spaces between adjacent units, said outlet passage cavity adapted for connection to a seawater exhaust line,
the improvements in combination, comprising:
  (a) said inlet manifold cavity and said outlet manifold cavity each having monatonically decreasing passage areas in the linear direction of the row of electrode plate units away from their respective supply connection and exhaust connection ends, to tend to promote a uniform pressure differential across all the spaces between electrode units along the length of the row.

2. Apparatus in accordance with claim 1,
 (iv) said electrode plate units having a predetermined nominal characteristic rate of flow for seawater through each space between adjacent units,
the improvements being further characterized by:
 (b) said inlet manifold cavity being formed between the lower edges of the electrode plate assemblies and a spaced lower wall having an upwardly concave curvature of convergence toward said edges in the linear direction of the row of electrode plate units away from the supply connection end of the cavity,
 (c) said outlet manifold cavity being formed between the upper edges of the electrode plate units and a spaced upper wall having a substantially fixed slope of convergence toward said edge in the linear direction of the row of electrode plate units away from the exhaust connection end of the cavity.

References Cited

UNITED STATES PATENTS 2,731,342  10/1955  Pickren.

WINSTON A. DOUGLAS, *Primary Examiner.*

C. F. LE FEVOUR, *Assistant Examiner.*